(12) United States Patent
Kim

(10) Patent No.: US 6,379,113 B1
(45) Date of Patent: Apr. 30, 2002

(54) PROPELLER APPARATUS

(76) Inventor: Chang Sun Kim, 358-7 Namchon-Dong, Namdong-Ku, Inchun-Shi (KR)

( * ) Notice: Subject to any disclaimer, the term of this patent is extended or adjusted under 35 U.S.C. 154(b) by 0 days.

(21) Appl. No.: 09/621,282

(22) Filed: Jul. 20, 2000

(30) Foreign Application Priority Data

Nov. 16, 1999 (KR) .............................................. 99-50878

(51) Int. Cl.[7] .................................................. F03D 1/04
(52) U.S. Cl. .................................. 415/199.4; 415/182.1
(58) Field of Search ........................... 415/199.4, 199.5, 415/182.1; 417/366, 423.5, 423.15, 423.14

*Primary Examiner*—Christopher Verdier
*Assistant Examiner*—J M McAleenan
(74) *Attorney, Agent, or Firm*—Birch, Stewart, Kolasch & Birch, LLP

(57) ABSTRACT

A multi-stage propeller assembly including a barrel having a cylindrical actuation part and a tapered nozzle part, with the tapered nozzle part integrally extending from the cylindrical actuation part while being reduced in its diameter in a direction from one end around the actuation part to the other end. A drive engine for propellers is installed within the tapered nozzle part, with the drive shaft of the engine axially extending within the actuation part. A plurality of propellers are regularly set along the drive shaft to form the multi-stage propeller assembly. A plurality of fixed radial blade units are regularly set between the propellers.

8 Claims, 3 Drawing Sheets

PROPELLER APPARATUS

BACKGROUND OF THE INVENTION

1. Field of the Invention

The present invention relates to a propeller apparatus used in fluid, such as air or water, to generate propulsion and, more particularly, to a propeller apparatus designed to effectively prevent rotating energy loss caused by a formation of a vortex within the apparatus and to allow the rotating energy of a propeller to entirely act in the propulsion direction and to maximize energy efficiency of a drive engine through using both heat dissipated from the radiation fins of the engine and hot exhaust gas discharged from the exhaust ports of the engine since the drive engine is installed within the tapered nozzle part of the barrel and to accomplish optimal propulsion.

2. Description of the Prior Art

As well known to those skilled in the art, propellers or screws have been typically used in air and water to generate desired propulsion. In a conventional propeller apparatus, it is necessary to design the propeller to increase fluid flow rate during its rotating action, and so the propeller is forced to have a large blade angle and to rotate at a high speed. However, such a large blade angle of a propeller necessarily induces large fluid resistance acting on the blades of the propeller during a rotating action of the propeller, and undesirably overloads the drive means for the propeller. FIG. 5 is a schematic view showing an operation of a conventional propeller apparatus. As shown in the drawing, a propeller 01 is set on the rotating shaft 03 of a drive engine 02 and is rotated in an open space while forming a swirl in fluid when it is rotated to generate propulsion. Such a swirl of fluid increases the centrifugal force of the propeller, thus undesirably expelling the fluid in a centrifugal direction of the propeller. This finally induces rotating energy loss of the propeller due to, for example, the frictional resistance acting on the blades of the propeller, thus preventing the propeller apparatus from forming desired propulsion. When the fluid is expelled in the centrifugal direction of the propeller as described above, a vortex is formed in the fluid, thus resulting in additional energy loss. Such additional energy loss due to the vortex cooperates with the rotating energy loss due to the frictional resistance to further reduce operational efficiency of the propeller apparatus.

In a brief description, the conventional propeller apparatus has a structural defect in that it undesirably induces a large quantity of energy loss during a conversion of the rotating force of the propeller into propulsion.

SUMMARY OF THE INVENTION

Accordingly, the present invention has been made keeping in mind the above problems occurring in the prior art, and an object of the present invention is to provide a propeller apparatus, in which a plurality of propellers are regularly and concentrically set within a cylindrical barrel to form a multi-stage propeller assembly, thus increasing the flow rate of outlet fluid ejected from the barrel, and in which the drive means for the propellers is set within the barrel, thus increasing the temperature and pressure of the fluid, using the thermal energy dissipated from the drive means, thus effectively forming desired strong propulsion from the rotating energy of the propellers.

In order to accomplish the above object, the present invention provides a propeller apparatus, comprising a barrel having a cylindrical actuation part and a tapered nozzle part, the tapered nozzle part integrally extending from the cylindrical actuation part while being reduced in its diameter in a direction from one end around the actuation part to the other end, a drive engine installed within the tapered nozzle part, with the drive shaft of the engine axially extending within the actuation part, a plurality of propellers regularly set along the drive shaft to form a multi-stage propeller assembly, and a plurality of fixed radial blade units regularly set between the propellers.

BRIEF DESCRIPTION OF THE DRAWINGS

The above and other objects, features and other advantageous of the present invention will be more clearly understood from the following detailed description taken in conjunction with the accompanying drawings, in which.

DETAILED DESCRIPTION OF THE INVENTION

Figure 1:
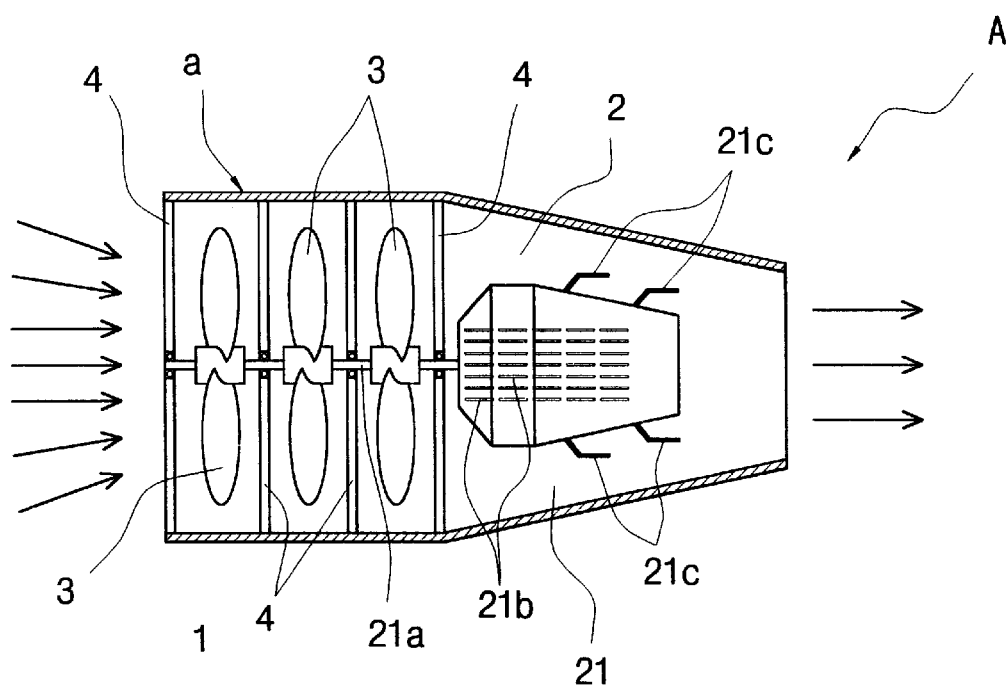
FIG. 1 is a side sectional view, showing the construction of a propeller apparatus in accordance with the primary embodiment of the present invention.
Figure 2:
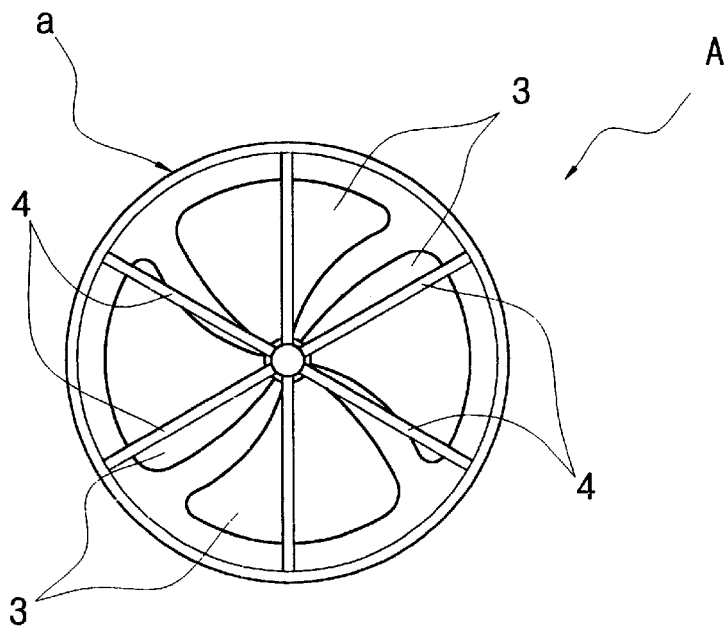
FIG. 2 is a front view of the propeller apparatus of FIG. 1.
Figure 3:
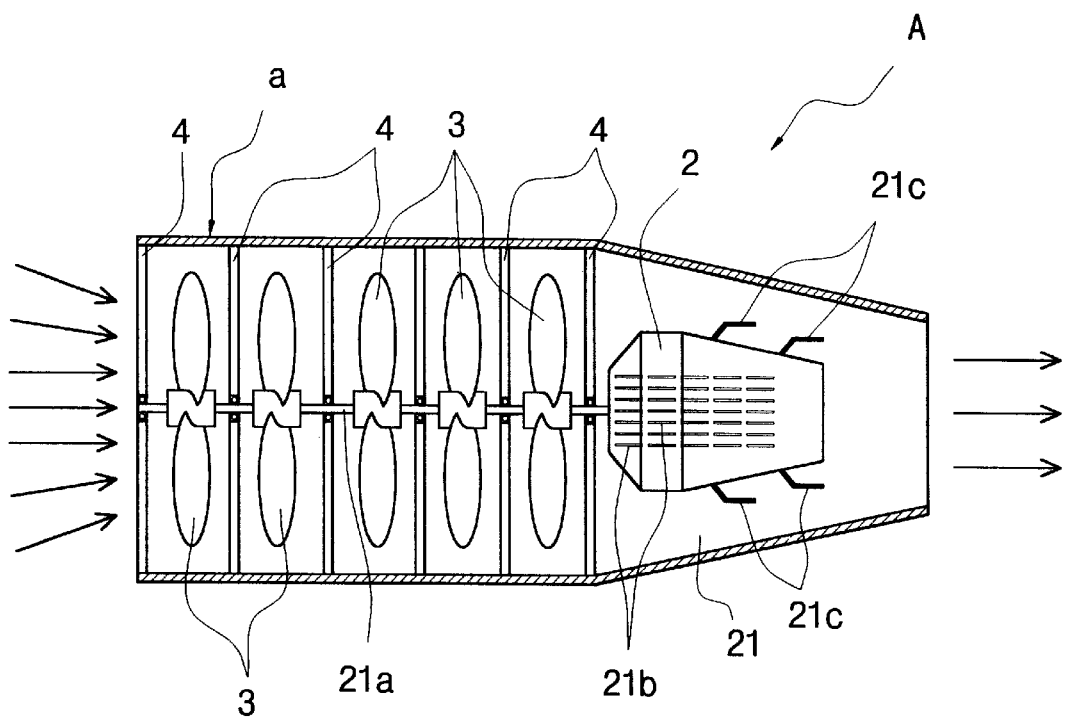
FIG. 3 is a side sectional view, showing the construction of a propeller apparatus in accordance with the second embodiment of the present invention.
Figure 4:
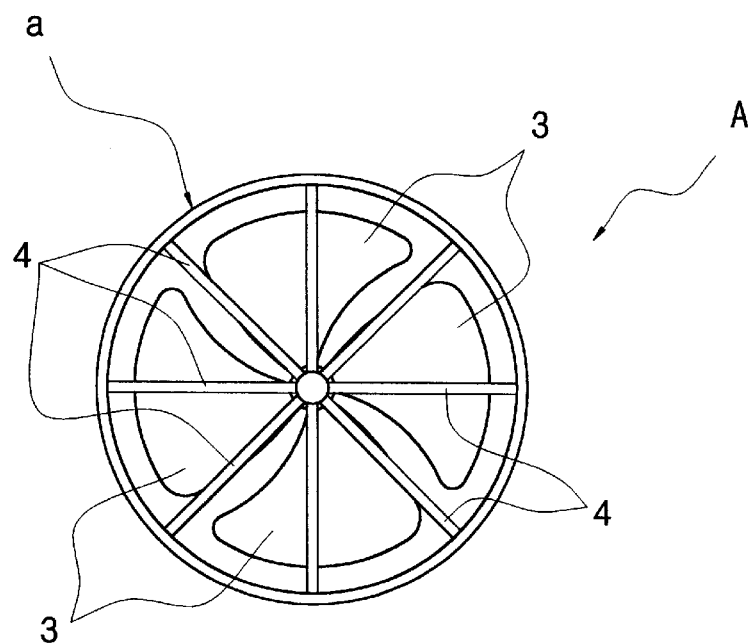
FIG. 4 is a front view of the propeller apparatus of FIG. 3.
Figure 5:
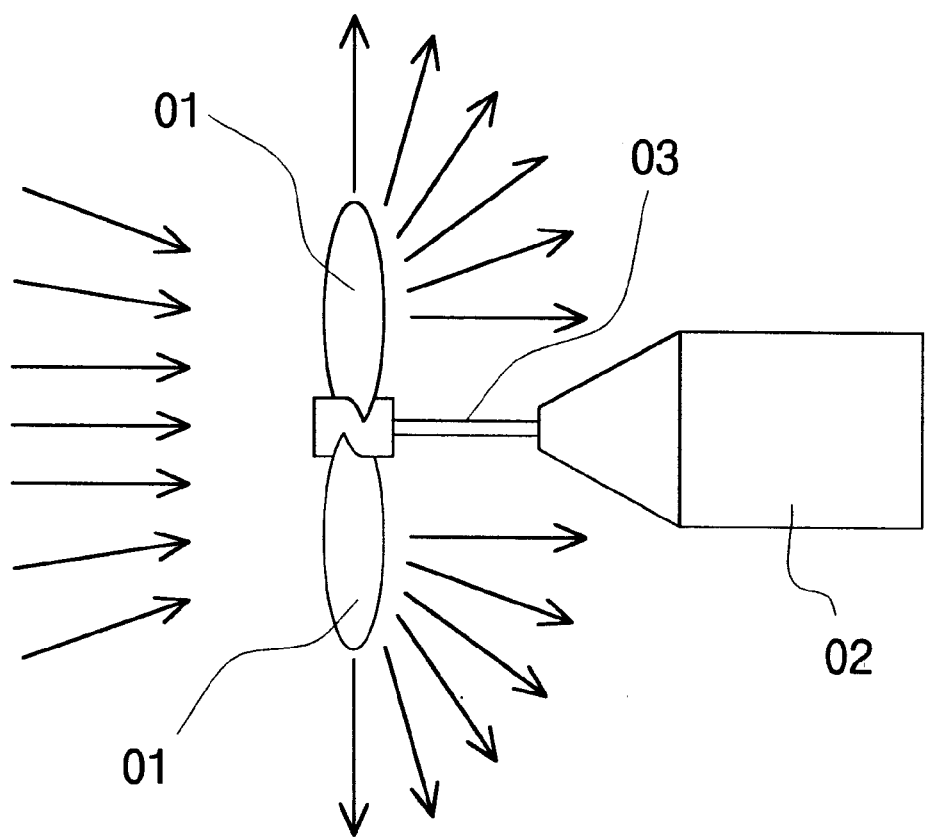
FIG. 5 is a schematic view showing an operation of a conventional propeller apparatus.

FIG. 1 is a side sectional view, showing the construction of a propeller apparatus in accordance with the primary embodiment of the present invention. FIG. 2 is a front view of the propeller apparatus of FIG. 1. FIG. 3 is a side sectional view, showing the construction of a propeller apparatus in accordance with the second embodiment of the present invention. FIG. 4 is a front view of the propeller apparatus of FIG. 3.

As shown in FIGS. 1 and 2, the propeller apparatus "A" according to the preferred embodiments of this invention comprises a barrel "a", a drive engine 21, a propeller 3 and a fixed radial blade unit 4.

The barrel "a" has a hollow cylindrical shape, consisting of a cylindrical actuation part 1 and a tapered nozzle part 2 integrated with each other into a single hollow body. In such a case, the tapered nozzle part 2 is linearly reduced in its diameter in a direction from the end around the actuation part 1 to the other end, and so the fluid inlet part of the barrel "a" has a diameter larger than that of the fluid outlet part. The drive engine 21 is installed within the tapered nozzle part 2, with the drive shaft of the engine 21 axially extending within the actuation part 1. One or more propellers 3 are regularly set along the drive shaft of the engine 21 to form a multi-stage propeller assembly. A plurality of fixed radial blade units 4 is regularly set between the propellers 3.

That is, the drive engine 21 is installed within the tapered nozzle part 2 in a way such that its drive shaft axially extends within the actuation part 1. A plurality of radiation fins 21a are formed on the housing of the engine 21 so as to promote heat dissipation from the engine 21 during an operation of the engine 21. In addition, a plurality of exhaust gas ports 21c are formed on the engine 21 so as to discharge hot exhaust gas from the engine 21. Therefore, the interior temperature of the nozzle part 2 of the barrel "a" is kept at a desired high point by heat dissipated from the engine 21 and hot exhaust gas output from the engine 21 during an operation of the propeller apparatus.

The propellers 3 of the multi-stage propeller assembly are regularly set along the drive shaft of the engine 21. When the propellers 3 rotate by the drive force of the engine 21, the propellers 3 suck fluid into the barrel "a" through the fluid inlet end of the barrel. In such a case, since the barrel "a" concentrically surrounds the propeller assembly, sucked pressurized fluid is not expelled in the centrifugal direction of the propellers 3, but entirely flows backward to form desired high propulsion while being discharged from the nozzle part 2.

The fixed radial blade units 4 are regularly set between the propellers 3 within the actuation part 1 of the barrel "a". The above blade units 4 prevent sucked fluid from being induction-rotated or from forming a vortex within the actuation part 1 during a rotating action of the propellers 3, thus finally preventing undesirable energy loss due to such a vortex.

The operational effect of the propeller apparatus "A" according to this invention will be described herein below.

When the propeller apparatus "A" of this invention is used in an airplane for generating propulsion in the air, one or more propellers 3 are regularly set along the drive shaft of the engine 21 to form a desired multi-stage propeller assembly within the cylindrical actuation part 1 of the barrel "a". In such a case, the cylindrical actuation part 1 has a predetermined length. On the other hand, the drive engine 21 for the propellers 3 is installed with the tapered nozzle part 2 of the barrel "a", which integrally extends from the actuation part 1 while being linearly reduced in its diameter in the direction from the end around the actuation part 1 to the other end. During an operation of the propeller apparatus "A", the propellers 3 rotate by the drive force of the engine 21, thus sucking air under high pressure into the actuation part 1 of the barrel "a" through the fluid inlet end of the barrel. In such a case, the barrel "a", concentrically surrounding the propellers 3, prevents the sucked pressurized air from being expelled in the centrifugal direction of the propellers 3, but guides the air to entirely flow backward to form desired high propulsion while being discharged from the nozzle part 2. Therefore, the propeller apparatus "A" of this invention is free from undesirable loss of the rotating force of the propellers 3. In addition, the radial blade units 4, regularly set between the propellers 3 within the actuation part 1 of the barrel "a", prevent the air from forming a vortex within the actuation part 1 during the rotating action of the propellers 3. This finally prevents undesirable energy loss of the propeller apparatus "A" due to such a vortex. The propeller apparatus "A" of this invention thus forms desirable high propulsion while highly increasing the interior pressure of the barrel "a" by the pressurized air flowing from the actuation part 1 to the nozzle part 2.

During an operation of the propeller apparatus, heat is dissipated from the radiation fins 21a formed on the housing of the engine 21 installed within the tapered nozzle part 2. In addition, hot exhaust gas is discharged from the engine 21 through the exhaust gas ports 21c of the engine 21. Therefore, the interior temperature of the tapered nozzle part 2 of the barrel "a" is kept at a desired high point by heat dissipated from the engine 21 and hot exhaust gas output from the engine 21 during the operation of the propeller apparatus. The sucked air within the barrel "a" quickly expands in its volume and is quickly increased in its pressure due to both the tapered air passage of the nozzle part 2 and the high temperature within the nozzle part 2. The sucked air is thus discharged from the nozzle part 2 through the air outlet end of the part 2 at a very high speed while forming desired high propulsion.

In a detailed description, the propeller apparatus of this invention has a plurality of propellers 3, which are regularly set within the cylindrical actuation part 1 of a barrel "a" to form a desired multi-stage propeller assembly, with a tapered nozzle part 2 integrally extending from the actuation part 1 while being linearly reduced in its diameter in the direction from the end around the actuation part 1 to the other end. In addition, a plurality of fixed radial blade units 4 are regularly set between the propellers 3 within the actuation part 1 of the barrel "a", while a drive engine 21 for the propellers 3 is installed with the tapered nozzle part 2 of the barrel "a". In an operation of the above propeller apparatus, atmospheric air is primarily sucked into the cylindrical actuation part 1 of the barrel "a" through the air inlet end of the barrel "a" by suction force formed by a rotating action of the propellers 3, and secondarily flows under high pressure in a propulsion direction of the propeller apparatus so as to be finally discharged from the nozzle part 2 through the air outlet end. In such a case, the barrel "a" prevents pressurized air from being expelled in the centrifugal direction of the propellers 3, while the fixed radial blade units 4 prevent pressurized air from forming a vortex within the barrel "a". Therefore, the propeller apparatus of this invention is free from propulsion loss caused by the air expelled in the centrifugal direction of the propellers 3. When the pressurized air passes through the tapered nozzle part 2 of the barrel "a" at a high speed, the air quickly expands in its volume and is quickly increased in its pressure. Such an increase in the pressure of the air within the nozzle part 2 allows the volume of the air to further expand. The pressurized air is thus finally discharged from the nozzle part 2 of the barrel "a" into the atmosphere at a very high speed.

In such a case, since the engine 21 is installed within the tapered nozzle part 2 of the barrel "a", the pressurized air passing through the nozzle part 2 is kept at a desired high temperature due to both heat dissipated from the radiation fins 21a of the engine 21 and hot exhaust gas discharged from the exhaust ports of the engine 21. It is thus possible to maximize energy efficiency of the engine 21.

In the preferred embodiments of this invention, the number of propellers 3 within the actuation part 2 of the barrel "a" is set to three in the primary embodiment of FIGS. 1 and 2 or to five in the second embodiment of FIGS. 3 and 4, with the number of blades of each radial blade unit 44 installed between the propellers 3 being set to six in both embodiments. However, it should be understood that the number of propellers 3 and the number of blades of each radial blade unit 4 may be changed as desired without affecting the functioning of this invention. In addition, the propeller apparatus "A" of this invention may be preferably used in ships for generating propulsion in water in addition to airplanes.

As described above, the present invention provides a propeller apparatus, in which a plurality of propellers for generating propulsion are regularly and concentrically set within a cylindrical barrel to form a multi-stage propeller assembly, thus increasing the flow rate of outlet fluid ejected from the barrel. In such a case, the barrel prevents fluid from being expelled in a centrifugal direction of the propellers, while a plurality of fixed radial blade units installed between the propellers prevent a formation of a vortex within the barrel. The propeller apparatus of this invention thus allows the fluid to flow to the nozzle part at a very high speed. In addition, a drive engine for the propellers is set within the barrel, thus increasing the temperature and pressure of the fluid using thermal energy caused by both heat dissipated from the drive engine and hot exhaust gas of the drive engine. This finally expands the fluid flowing in the nozzle part and allows the fluid to be discharged under high pressure from the fluid outlet end of the nozzle part having a diameter smaller than that of a fluid inlet end of the actuation part of the barrel. The propeller apparatus of this invention thus generates desired strong propulsion. Another advantage of the propeller apparatus of this invention resides in that the number of elements of the apparatus is reduced, thus resulting in a desirable reduction in the production cost of the propeller apparatus.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A multi-stage propeller assembly, comprising:
   a barrel having a cylindrical actuation part and a tapered nozzle part, said tapered nozzle part integrally extending from said cylindrical actuation part while being reduced in its diameter in a direction from an end around said actuation part to another end;
   a drive engine provided within said barrel;
   at least two propellers set within said barrel; and
   a plurality of fixed radial blade units set between said propellers.

2. The multi-stage propeller assembly according to claim 1, wherein said drive engine is installed within said tapered nozzle part of the barrel.

3. The multi-stage propeller assembly according to claim 1, wherein said drive engine further comprises a drive shaft extending axially within the actuation part of the barrel.

4. The multi-stage propeller assembly according to claim 1, wherein said drive engine further comprises a plurality of exhaust gas ports so as to discharge hot exhaust gas from the engine.

5. The multi-stage propeller assembly according to claim 1, wherein said at least two propellers are installed within said actuation part of the barrel.

6. The multi-stage propeller assembly according to claim 5, wherein the number of propellers is three.

7. The multi-stage propeller assembly according to claim 5, wherein the number of propellers is five.

8. The multi-stage propeller assembly according to claim 1, wherein said plurality of fixed radial blade units having six blades.

* * * * *